May 30, 1967 O. Z. FRAZIER 3,322,061
HOT AIR ROTISSERIE ENGINE ATTACHMENT
Filed June 23, 1965 3 Sheets-Sheet 1

INVENTOR.
ORVILLE Z. FRAZIER
BY
ATTORNEYS

May 30, 1967  O. Z. FRAZIER  3,322,061
HOT AIR ROTISSERIE ENGINE ATTACHMENT
Filed June 23, 1965  3 Sheets-Sheet 2

INVENTOR.
ORVILLE Z. FRAZIER
BY
ATTORNEYS

May 30, 1967　　　　O. Z. FRAZIER　　　　3,322,061
HOT AIR ROTISSERIE ENGINE ATTACHMENT
Filed June 23, 1965　　　　　　　　　　　　3 Sheets-Sheet 3

INVENTOR.
ORVILLE Z. FRAZIER
BY
ATTORNEYS

United States Patent Office 3,322,061
Patented May 30, 1967

3,322,061
HOT AIR ROTISSERIE ENGINE ATTACHMENT
Orville Z. Frazier, 732 Sherman,
Grand Rapids, Mich. 49503
Filed June 23, 1965, Ser. No. 466,401
5 Claims. (Cl. 99—421)

This invention relates to rotisserie type, culinary apparatus, and more particuarly to an outdoor, charcoal burning, powered rotisserie.

The present widespread adoption by families of outdoor charcoal preparation of food has created a demand for various types of charcoal grill equipment. Presently available types of equipment capable of continuously rotating the food include either electrical motor powered rotisserie units for use in the back yard or other places where an electrical outlet is conveniently accessible, or manually cranked rotisseries for picnic areas, camping sites, and the like where no electrical outlets are available. Some motorized units enable removal to be convertible between these types. This allows alternate use depending upon the presence or absence of electrical outlet facilities. Needless to say, it would be extremely desirable to be able to have power operation of the rotisserie in a practical manner, even when electrical power is not available. This is not possible, however, with available units. In fact, it would be advantageous to have a non-electrical, practical power unit that could be readily attached to the existing thousands of rotisseries already owned to replace the conventional electrical motor and enable the rotisseries to be power operated no matter where it is used.

It is an object of this invention to provide a power attachment unit for charcoal type rotisseries, enabling power operation of the apparatus independently of electrical power outlets. The attachment can be used at any time and any place. It requires no special fuel. It actually employs the heated charcoal itself for driving power. It provides continuous dependable operation.

Another object of this invention is to provide an attachable substitutable power unit for a charcoal rotisserie that can replace, either temporarily or permanently, electrical motor units presently employed on the existing rotisseries owned by members of the public. It is thus not necessary for rotisseries owners to purchase an entirely new rotisserie apparatus to take advantage of this feature. Rather, the purchasers can buy only the power self-contained unit itself and simply attach it to presently owned rotisseries, providing available power operation usable at any time and place.

Another object of this invention is to provide a lightweight, dependable replacement power attachment unit for rotisseries, having a simple slide bracket attachment for removable mounting on the flange type brackets on conventional rotisseries, in place of the electrical motors now used, or enabling mounting on manually operated types by simple securement of a bracket and the power unit on the rotisserie housing.

Another object of this invention is to provide a removable integral, self-contained, power hot air engine attachment for conventional rotisseries, whether new or used, capable of operating the rotisserie from the heat of the charcoal itself.

Another object of this invention is to provide a self-contained hot air engine power attachment unit that is readily attachable to rotatable rotisserie equipment and is capable of providing variable, selected rates of rotation merely by regulating the amount of glowing charcoal placed beneath a portion of it. The attachment unit is lightweight and completely portable. So is the assembled attachment to the rotisserie. By the use of this novel attachment, the heat from the fuel pit serves the dual functions of roasting the food and rotating the food, while also being extremely quiet in operation. It has proven to be capable of use over extended periods of time in completely dependable fashion.

These and several other objects of this invention will become apparent upon studying the following specification in conjunction with the drawings in which.

Figure 2:
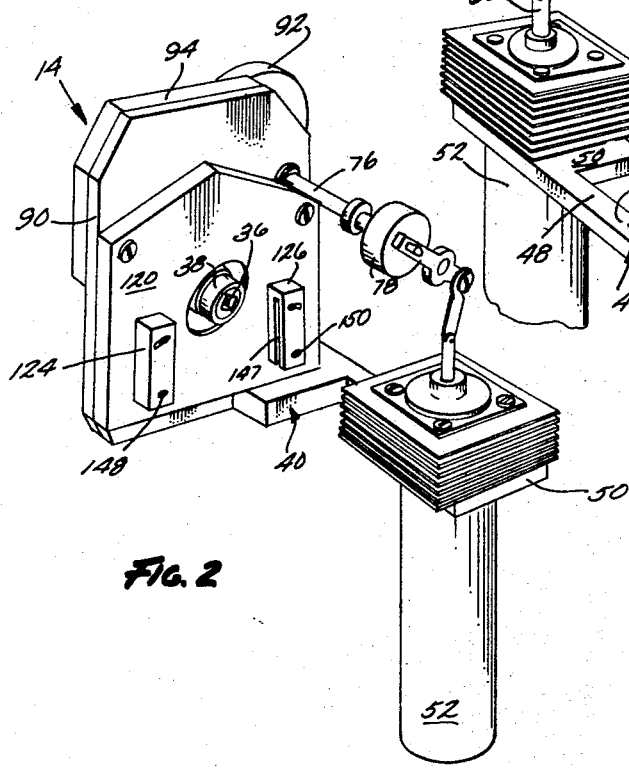
FIG. 2 is a perspective enlarged view of the hot air engine attachment unit.
Figure 6:
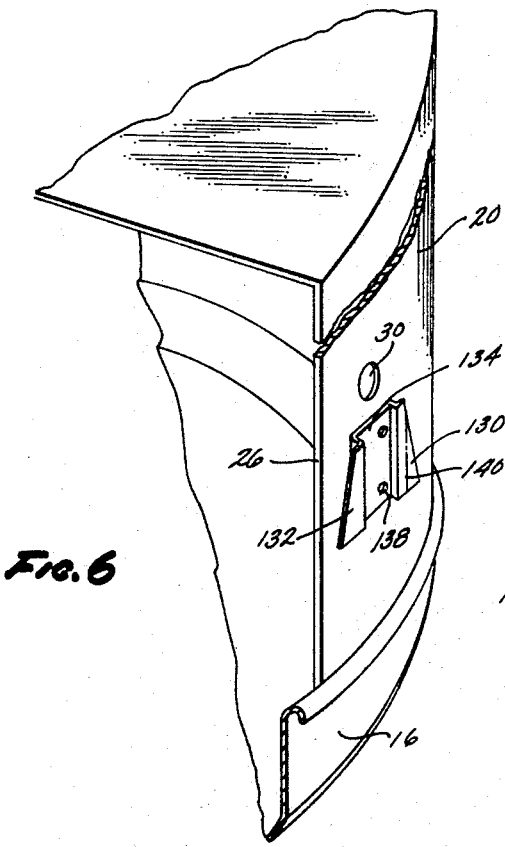
FIG. 6 is a fragmentary, perspective, partially sectioned view of a portion of the rotisserie housing in FIG. 1.
Figure 7:
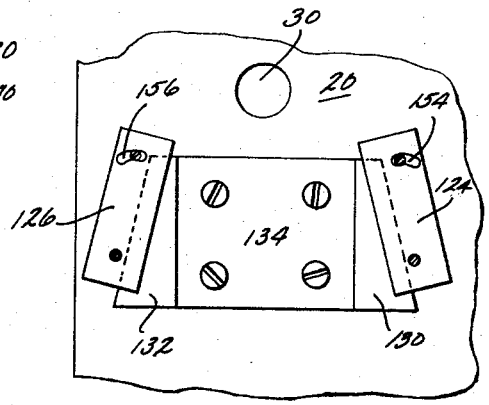
Figure 8:
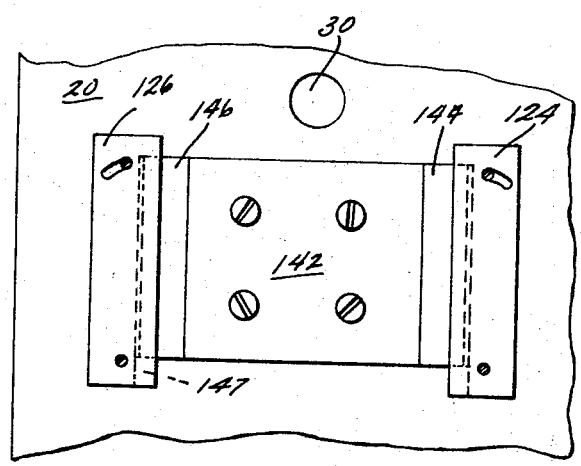

FIG. 7 is a fragmentary elevational view of the bracket in FIG. 6 and a portion of the housing, illustrating the back side of the bracket receiving elements normally attached to the power unit in FIG. 2 in their cooperative relation to the bracket; and FIG. 8 is a fragmentary enlarged view of an alternate form of bracket to that in FIG. 7, with the bracket receiving elements in their cooperative relation to the alternate bracket.

Figure 1:
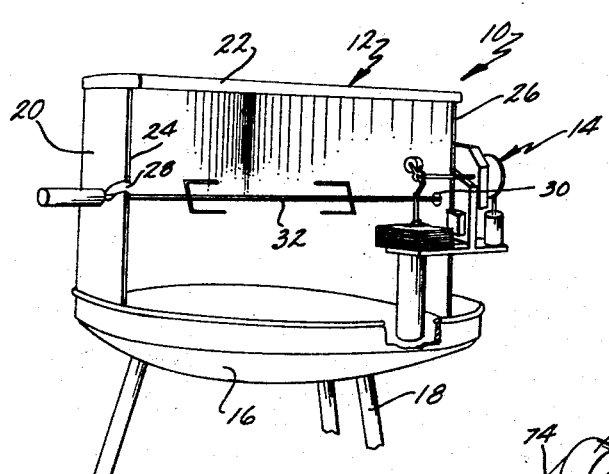
FIG. 1 is a perspective view of the novel self-contained hot air engine attachment unit removably mounted on a rotisserie.

Referring now specifically to the drawings, the complete rotisserie combination 10 illustrated in FIG. 1 includes the rotisserie sub-assembly 12 and the integral, removable, self-contained attachment power unit sub-assembly 14.

The rotisserie sub-assembly 12 includes a hollow, pan-shaped container 16 forming an inner charcoal pit. It is preferably supported on a plurality of legs 18 or similar support means. Extending upwardly around part of the charcoal pit, is a generally semi-cylindrical housing cowl 20, preferably having a top portion 22. This housing cowl has a pair of vertical front edges 24 and 26 on opposite sides thereof, with a shaft receiving slot 28 in edge 24, and a shaft receiving through opening 30 spaced slightly from and adjacent to edge 26. These openings receive a skewer shaft 32 or the shaft of a food basket. With this invention, the end of the shaft extending through orifice 30 is removably, slidably received in a cooperative hollow end 36 of the power output spindle 38 in the power unit sub-assembly 14 (FIG. 2).

The power unit 14 is supported on a generally U-shaped horizontal mounting plate 40 which has one leg 42 that mounts a power cylinder 44, a cross leg or second portion 48 which is configurated to extend around the front of housing edge 26, and a third leg portion 50 that mounts a displacer cylinder 52 that depends therefrom. Secured to and extending up from leg 42 is a vertical mounting plate 90 that supports the gear drive and interconnection means 46 between the cylinders.

The elongated displacer cylinder 52 extends down into the charcoal pit, with its lower end elevated a couple of inches above the surface of the charcoal pit so that glowing charcoal can be placed beneath it. This cylinder has its lower end closed. It has cooling fins 54 around its upper end. The mounting leg 50 of plate 40 encircles the upper end of the cylinder to support it. The upper end of the cylinder is covered by a cap 56 having an integral bushing 58 through which the piston rod 60 connected to the displacer piston 62 inside cylinder 52. Four elongated screws 68 extend down through cover plate 70, through fins 54, and into support mount 50.

A connecting link 72 has its lower end pivotally connected to the upper end of shaft 60, and its upper end pivotally connected to one end of crank 74. The crank is affixed at its center to the shaft 76. A counterweight 78 is mounted on the opposite end of crank 74. It is adjustable radially of crank 74 (FIG. 2) with a sliding movement. Shaft 76 extends directly through and into rotatable relationship with upstanding rigid support plate 90. On the opposite end of shaft 76, a fly wheel 92 is mounted to rotate therewith. Pivotally and eccentrically attached to this fly wheel, offset from shaft 76, is a second connecting rod 98. It extends into the open upper end of power cylinder 44 and is pivotally mounted at its lower end to the power piston 100. The piston is slidably reciprocable in power cylinder 44.

This power cylinder, open at the upper end, has a close interfit with the piston to prevent any significant leakage of gases thereby. The displacer piston 62 on the other hand, floats in the displacer cylinder 52 with a substantial clearance around its periphery to allow controlled gas passage. The displacer piston is usually approximately 1/10 to 1/8 inch smaller in diameter than the displacer cylinder inner diameter to allow this. Normally, therefore, the displacer piston does not touch the displacer cylinder wall.

The upper end portion of the chamber in the displacer cylinder 52 communicates to the lower end of the power cylinder 44 through a gas passage 110 that preferably is a drilled passageway through the horizontal support 40.

Mounted on shaft 76, between its ends, and within the housing shell member 94, is a spur gear 96 which rotates with the shaft. This small spur gear meshes with a larger spur gear 112 positioned behind it and affixed to a rotational shaft 114 that also mounts a small spur gear 116. This second small spur gear interengages with a second large spur gear 118, both of these latter gears being in housing member 120 on the inside of vertical plate 90. Attached to this spur gear 118 to rotate therewith is the power output spindle 38 (FIGS. 2 and 4) which has a hollow inner end to receive a shaft 32 that supports food.

Affixed to the outside face of housing member 120 is a pair of bracket receiving elements 124 and 126. These cooperatively receive coplanar, spaced flanges 130 and 132 respectively of a plate bracket 134 mounted to the outside face of housing 20 adjacent edge 26. This bracket is conventionally mounted on charcoal rotisseries as by a plurality of screws 138, with flanges 130 and 132 being offset and spaced from the housing wall so as to interfit with bracket receiving means. Sometimes these brackets are tapered downwardly and outwardly as in FIGS. 6 and 7, and sometimes they are simply vertical as shown by the phantom lines 140 in FIG. 6, or shown specifically by bracket 142 with flanges 144 and 146 in FIG. 8.

The bracket receiving elements 124 and 126 are vertically elongated and have a pair of facing inner slots 146 that extend from the bottom almost to the top. They are preferably terminated short of the top, to form a stop surface at the top of these slots. These elements are attached to housing portion 120 by suitable fastening means such as a pair of screws 148 and 150 on elements 124 and 126, respectively. Preferably one of each pair of the screws, such as the upper ones, extend through arcuate slots 154 and 156 (for the elements 124 and 126 respectively). Thus, by loosening the screws, the lower ones serve as pivots, allowing the upper ends of the elements to be tilted inwardly to be at an angle, diagonally divergent outwardly and downwardly for interfitting with the tapered flanges 130 and 132 shown in FIG. 7. (FIGS. 7 and 8 show these elements 124 and 126 removed from the power unit for purposes of illustration.)

Figure 3:
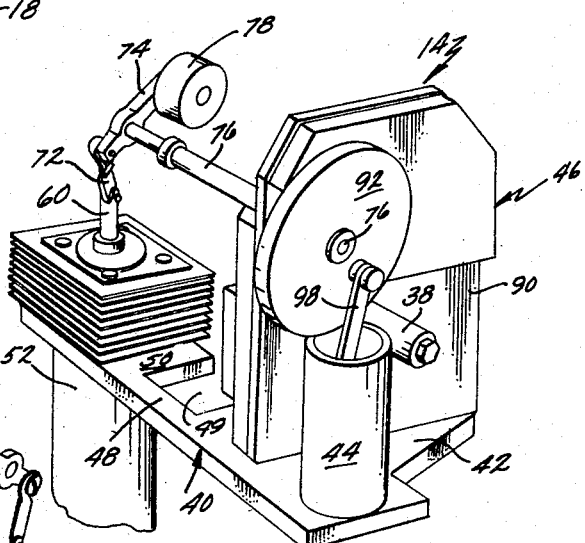
FIG. 3 is a perspective view of the unit from an opposite end to that in FIG. 2.
Figures 4, 5:
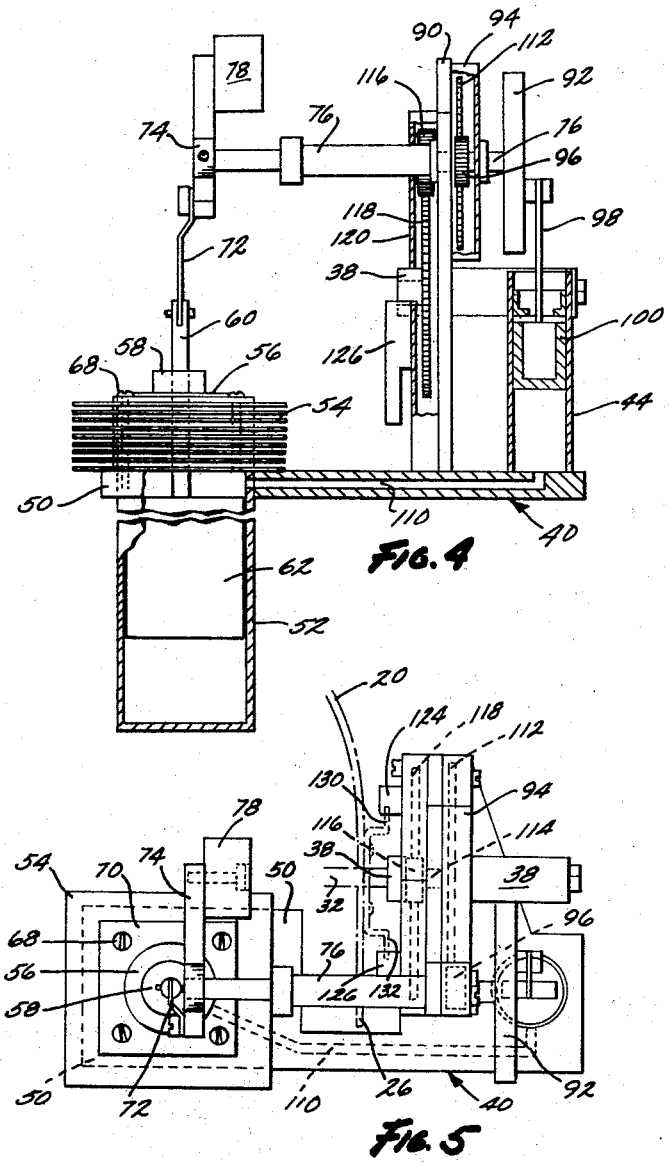
FIG. 4 is an elevational, partially sectioned view of the self-contained mountable power unit in FIGS. 2 and 3.
FIG. 5 is a plan view of the removable attachment unit in FIGS. 2 through 4, showing, in phantom, portions of the rotisserie housing and mounting bracket.

Thus, to attach the self-contained engine unit in FIGS. 2 and 3 to the bracket of the rotisserie, the unit is placed astraddle housing edge 26. I.e., edge 26 extends into space 49 adjacent cross leg 48 of the support 40, between legs 42 and 50 (FIG. 5). The engine unit is lowered so that bracket flanges 130 and 132 are received in the slots 147 of elements 124 and 126 as shown in FIG. 5. The unit is then firmly in place and ready for operation. It can be removed just as readily simply by lifting the engine off the bracket.

Instead of the type of flange bracket in FIGS. 6 and 7, some units presently on the market employ the type of flange bracket 142 shown in FIG. 8. To accommodate the engine attachment unit to this type of bracket, the screws on elements 124 and 126 are loosened, the elements are tilted to their upright position parallel with each other, and slots 147 are slid down over flanges 144 and 146 until the flanges abut the upper ends of the slots. The unit is then ready for operation.

In either instance the spindle 38 is aligned with orifice 30 of housing 20 for placing one end of shaft 32 through this orifice and into driving relation with the spindle. Preferably, the cranks of the two cylinders are purposely rotatably offset at approximately 90° with respect to each other, with the displacer crank being 90° ahead of the power cylinder crank. This has been found to effect optimum operation.

*Operation*

To use the novel attachment unit on the barbecue housing therefore, it is simply necessary to insert the bracket around the front edge of the housing in the manner described above, so that the lower end of the displacer cylinder 52 is positioned above the charcoal pit. It is then ready for operation. This is done by merely pushing the selected number of pieces of glowing charcoal beneath this displacer cylinder to obtain the desired speed of operation. The lower end of the displacer cylinder must be maintained hot, with the amount of heat determining the speed of the engine. The upper end is maintained as cool as possible for optimum efficiency, this being aided with cooling fins 54. Conceivably other cooling means could be used such as a water jacket. Due to the location of the displacer cylinder above the fuel pit, the lower edge of the cylinder is also below the level of the retaining flange in the pit to be protected from breezes.

The heat from the charcoal causes the gases in the bottom of the displacer cylinder to expand, thereby forcing the displacer piston to rise toward the top of the cylinder which is cool. As it rises, it forces the gases at the upper end of the displacer cylinder through passageway 110 into the bottom of the power cylinder. These gases are substantially cool. They force power piston 100 upwardly to forcefully vent the gases in the upper end of the power cylinder to the atmosphere through the open upper end. When displacer piston 62 rises, it pushes its connecting rod and crank linkage to rotate shaft 76. This in turn rotates fly wheel 92. After the displacer piston rotates the shaft a substantial amount, the pressure on the power piston causes it to continue the rotation of shaft 76 by movement of its connecting rod 98 and thus of the fly wheel.

After the displacer piston reaches the top, the gases therebeneath are cooled a significant amount to cause them to contract and allow the piston to return downwardly. The continued movement of the power piston and also of the fly wheel causes the displacer piston to be forced back down also. The seepage of the gases around the outside of the displacer piston allows the piston to lower. As the displacer piston nears the bottom of the displacer cylinder, the heated gases again expand rapidly to cause it to rise again. The mechanism thus continues to operate in a dependable constant fashion. Rotation of shaft 76 rotates the spur gears 96, 112, 116 and 118 to rotate output spindle 38 and drive the shaft that supports the food.

It has been found from actual use that the novel apparatus operates extremely effectively for long periods of time without any special personal attention other than to maintain heated charcoal in the fire pit beneath the bottom of the displacer cylinder. The mechanism operates extremely quietly. It has been found that by employing a displacer cylinder only one to three inches in diameter and about six to eight inches long, and a slightly smaller power cylinder, usually about ⅔ of the diameter of the displacer cylinder, the engine has completely adequate power to constantly rotate chickens, a ham, or any other meat or food placed on the spit or in a food basket on the shaft. The same source of heat thus roasts the food and also rotates the food constantly.

It will be realized that although only one spindle is shown, more than one could readily be employed.

The unit can be attached in place of an electrical motor on conventional units owned by the public with the attachment being simple and easily made. This attachment unit is self-contained, highly portable due to its light weight, and useful anytime and anywhere. It can be removed for replacement of the electrical motor or for operation by manual techniques. Additional advantages will probably occur to those in the art upon studying this foregoing description of the invention. Also, it is conceivable that various minor details of construction could be changed within the concept, for example, in the drive gear set up. Therefore, the invention is intended to be limited only by the scope of the appended claims and the reasonably equivalent structures to those defined therein.

I claim:

1. An integral, self-contained, rotisserie powering, hot air engine attachment unit comprising: a support; a displacer cylinder on one end of said support; a power cylinder on the opposite end of said support; a displacer piston in said displacer cylinder, having a connecting rod extending therefrom; a power piston in said power cylinder having a connecting rod extending therefrom; a rotatable output spindle; fly wheel means; interconnecting drive means between said connecting rods, said fly wheel means, and said spindle, to rotate said spindle; said support being configured to fit around the housing cowl of a rotisserie, and having bracket mount means attachable to a housing cowl to mount said attachment unit.

2. A unitary, self-contained, hot air engine power unit for removable attachment to a double flange bracket on one outside face of a charcoal rotisserie housing having a charcoal pit, and a pair of edges with means to receive a rotatable shaft, comprising: a generally U-shaped support to fit around one edge of the housing; a displacement cylinder and piston assembly mounted to and depending from one leg of said support to be inside the housing over the charcoal pit; a power cylinder and piston assembly mounted to the opposite leg of said support to be outside the housing; gas passage means between the top of said displacement cylinder and the bottom of said power cylinder; interconnecting drive connection means between said pistons; slotted bracket receiving means between said legs to slidably fit over a double flange bracket on the housing for suspending the unit thereon; and power output spindle means operably drivingly associated with said drive connection means, and oriented with its end generally toward the space between the legs of said U-shaped support and configurated to drivingly receive the rotatable shaft of the rotisserie.

3. In combination with a rotisserie having a charcoal pit, a housing extending above and partially around said charcoal pit and terminating in a pair of vertical edges, a rotatable food support shaft means suspended between said edges, and over said pit, and mounting means on said housing adjacent one of said edges; a unitary, self-contained, hot air engine power unit having a support with one portion on the outside face of said housing adjacent one of said edges, a second portion extending around said one edge, and a third portion on the inside face of said housing adjacent said one edge; a displacer cylinder and piston assembly depending from said third portion over said pit; a power cylinder and piston assembly mounted to said first portion outside said housing; drive connection means between said assemblies; a fly wheel operably connected to said drive connection means; a spindle operably connected to said drive connection means and having a hollow end receiving said shaft; and an engageable bracket receiving means on said support removably engaging said mounting means.

4. The apparatus in claim 3 wherein said support includes an upstanding vertical plate on said first support portion, said drive connection means being supported on said plate.

5. In combination with a rotisserie having a charcoal pit, a housing extending above and partially around said charcoal pit and terminating in a pair of vertical edges, a pair of shaft support means on said housing adjacent said edges; a rotatable food support shaft means suspended between said pair of support means, and over said pit, and power unit mounting means on the outside of said housing adjacent one of said edges; a unitary, self-contained, hot air engine power unit having a support with one portion on the outside face of said housing adjacent one of said edges, a second portion extending around said one edge, a third portion on the inside face of said housing adjacent said one edge, and an upstanding upright plate portion on said one portion to be outside said housing; a space between said first and third portions; a displacer cylinder and piston and rod assembly depending from said third portion over said pit; a power cylinder and piston and rod assembly mounted to said first portion outside said housing; drive connection means between said assemblies including a connecting rotatable shaft connected to said piston rods and rotatably mounted through said upright plate portion; a fly wheel operably connected to said rotatable shaft; a spindle extending from said plate toward said third portion, operably connected to said drive connection means, and having a hollow end oriented toward one of said pair of shaft support means for slidably receiving said shaft; and an engageable bracket receiving means on said plate, and forming slots adjacent said space for removably engaging said housing mounting means.

References Cited

UNITED STATES PATENTS

| | | | |
|---|---|---|---|
| 1,336,599 | 4/1920 | Tsekuras | 99—421 XR |
| 1,541,472 | 6/1921 | Born | 99—421 XR |
| 1,926,463 | 9/1933 | Stoddard | 60—59 |
| 2,391,571 | 12/1945 | Hennessy | 99—421 |
| 2,813,478 | 11/1957 | Popple | 99—421 X |
| 3,106,150 | 10/1963 | Gaeke | 99—421 X |
| 3,129,653 | 4/1964 | Kertesz | 99—421 |
| 3,184,914 | 5/1965 | Cole | 99—421 X |
| 3,257,936 | 6/1966 | Holka et al. | 99—421 |

WALTER A. SCHEEL, *Primary Examiner.*

S. P. FISHER, *Assistant Examiner.*